United States Patent [19]

Barrie et al.

[11] Patent Number: 4,837,728

[45] Date of Patent: Jun. 6, 1989

[54] MULTIPLE PROGRESSIVE GAMING SYSTEM THAT FREEZES PAYOUTS AT START OF GAME

[75] Inventors: Robert P. Barrie; Jon Bengtson, both of Reno, Nev.

[73] Assignee: IGT, Reno, Nev.

[21] Appl. No.: 573,771

[22] Filed: Jan. 25, 1984

[51] Int. Cl.[4] ........................ A63F 5/04; G07F 17/34; G06F 15/44

[52] U.S. Cl. ............................... 364/412; 273/138 A; 273/143 R

[58] Field of Search .................... 364/412; 273/138 A, 273/143 R

[56] References Cited

U.S. PATENT DOCUMENTS

| | | | |
|---|---|---|---|
| 4,099,722 | 7/1978 | Rodesch et al. | 273/143 R |
| 4,238,127 | 12/1980 | Lucero et al. | 273/143 R |
| 4,283,709 | 8/1981 | Lucero et al. | 364/410 X |
| 4,299,388 | 11/1981 | Resch et al. | 273/143 R |

FOREIGN PATENT DOCUMENTS

| | | | |
|---|---|---|---|
| 1550732 | 8/1979 | United Kingdom . | |
| 2092796 | 8/1982 | United Kingdom | 273/143 R |
| 2096376 | 10/1982 | United Kingdom | 273/143 R |
| 2097570 | 11/1982 | United Kingdom | 273/143 R |

*Primary Examiner*—Clark A. Jablon
*Attorney, Agent, or Firm*—Townsend & Townsend

[57] ABSTRACT

A rapidly incrementing multiple progressive gaming system. One or more gaming controllers are coupled to a progressive controller. Coin drop and win information at each gaming controller is provided to and accumulated by the progressive controller. Meter amounts generated at the progressive controller are transmitted back to the gaming controllers to provide multiple continually incrementing progressive bonus values. Upon game win, all gaming controllers not in play are reset to an initial starting value. Gaming controllers in play during a win are allowed to complete play at a progressive bonus value as established at beginning of game play. Any additional wins generated during the completion interval are paid at this progressive bonus value. A current progressive value is provided to update the game controller either continually or upon game completion. The game payouts are frozen upon detection of the coin drop so that the player knows the value(s) being played for.

1 Claim, 19 Drawing Sheets

Microfiche Appendix Included
(58 Microfiche, 2 Pages)

| | | | |
|---|---|---|---|
| FIG. 6A. | FIG. 6B. | FIG. 6C. | FIG. 6D. |
| FIG 6E. | FIG. 6F. | FIG. 6G. | FIG. 6H. |

| | |
|---|---|
| FIG. 7A. | FIG. 7B. |
| FIG. 7C. | FIG. 7D. |
| FIG. 7E. | FIG. 7F. |

PROGRESSIVE OUTPUTS (COIN-IN AND JACKPOT PULSES FROM GAMING MACHINES)

COIN-IN PULSES

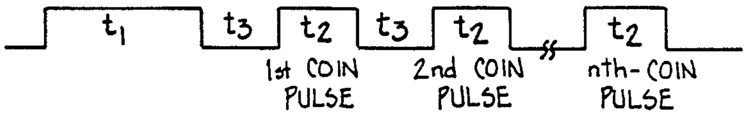

$t_1 \cong$ 100 ms
HEADER (NEW GAME INDICATION)

$t_2 \cong$ 50 ms
COIN-IN PULSES $t_3 \cong$ 50 ms
TIME BETWEEN COIN-IN PULSES DEPENDENT UPON PLAYER EXCEPT FOR TIME BETWEEN HEADER AND FIRST COIN-IN PULSE WHICH $\cong$ 100 ms.

FIG_9A.

JACKPOT PULSES

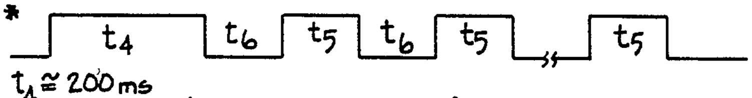

$t_4 \cong$ 200 ms
HEADER (JACKPOT INDICATION)

$t_5 \cong$ 50ms
WINNING LINE NUMBER OR COIN COLUMN PULSES $t_6 \cong$ 50ms
TIME BETWEEN PULSES

*(EXAMPLE: A THIRD LINE JACKPOT CONSISTS OF A HEADER AND THREE PULSES)

FIG_9B.

SERIAL TRANSMIT

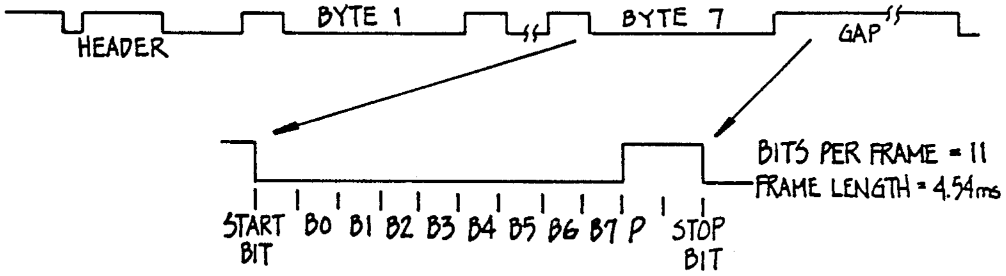

BAUD RATE = 2423

FIG_10.

MULTIPLE PROGRESSIVE GAMING SYSTEM THAT FREEZES PAYOUTS AT START OF GAME

A first microfiche appendix listing an exemplary game controller computer program, and consisting of 1 fiche having 20 frames is included as part of this patent application. A second microfiche appendix listing an exemplary progressive controller computer program, and consisting of 1 fiche having 38 frames is also included as part of this patent application.

BACKGROUND OF THE INVENTION

1. Field of the Invention

The present invention relates to gaming devices. More particularly, the present invention relates to progressive bonus gaming devices.

2. Description of the Prior Art

A progressive gaming device awards an incrementally varying payout, based on a percentage of total game play among several players, upon a game win. Prior art progressive gaming devices usually include a series of slot machines, interconnected to report coin drop and game win information to an accumulator/display driver. The accumulator receives information and correspondingly increments a single payout line progressive bonus until a win occurs.

The incrementing value of the progressive bonus is displayed on a large central display or on a number of remotely located displays. The displays, however, are not part of the individual gaming machines but, rather, are part of the accumulator. After a win, the accumulator resets itself (or is manually reset by an attendant) and begins incrementing again according to the game played.

A win is noted by a casino personnel and payed to the winning party. For example, if a winning party were to obtain all sevens on a slot machine, the progressive bonus would be given to the winning person. Such prior art progressive bonuses typically assign 1-2 percent of each coin placed in the machine to the progressive value.

Because an infrequent payout, such as all 7's, is a win on the progressive, there are payouts only every couple-to-few months. If a payout has occurred recently, there is very little incentive for players to compete to win the progressive bonus because they erroneously perceive an historical probability that another payout will not occur for some time.

SUMMARY OF THE INVENTION

The present invention is a multiple progressive gaming system, such as a slot machine. The invention allows for incremental pay type play on either a stand-alone machine or on a machine carousel with or without a large display.

One embodiment of the invention provides a slot machine having a reel strip set up to play as a normal slot machine except that the oranges, plums, bells, bars, and sevens are played according to a meter amount (which may be displayed on either side of a game video display) instead of paying the customary fixed amount.

Upon game initiation or after a win has been paid, the values in each meter are set to a start value based on the game's denomination. Because the present invention allows for a pay on several different wins, the likelihood of a bonus win is increased many times over that of prior art progressive machines. Accordingly, the present invention generates significant player interest. As a result of such player interest, the present invention assigns a significantly greater portion of each coin played to the progressive bonus—on the order of 25% of the value of the coin is distributed among five meters, in this preferred embodiment of the invention. For example, in a one dollar machine, the meters are incremented on every coin-in as follows:

| | | | |
|---|---|---|---|
| Oranges | increment 7 cents | 20.00 | (start value) |
| Plums | increment 6 cents | 30.00 | " |
| Bells | increment 5 cents | 50.00 | " |
| Bars | increment 4 cents | 200.00 | " |
| 7's | increment 3 cents | 1,000.00 | " |

Thus, the contribution to the progressive is the sum of the individual contributions divided by the coin denomination $(7+6+5+4+3)/100=25\%$.

When a player gets a winning combination, the amount shown on the incrementing payable bonus meters, as shown on the video display for the game played, is paid. After the payout is completed, the appropriate meter is reset to its start value. Once game play is initiated by the dropping of a coin into a game, the progressive meter values displayed on that machine are frozen to allow the player to ascertain the value of the jackpot during play. Such arrangement prevents a win during game play at another machine from lowering a progressive value that may be won thereafter.

The invention includes at least one game controller that initiates game play when the coin is dropped through a coin slot on the game controller. The game controller randomly generates a game win or loss during game play, which play is displayed in the form of a graphical video image. Each game win produces a game payout according to a game payout schedule.

Each game controller is coupled for two-way communication with a rapidly incrementing progressive controller. The progressive controller receives data from each game controller indicating coin receipt and game wins. The progressive controller assigns a portion of each coin to increment progressive bonus meters in accordance with a payout schedule, such as described above. The progressive controller then forwards the meter totals to each game controller to increment the meter amounts displayed by the game controllers.

When win information is received by the progressive controller, the game controllers are reset. The progressive bonus value is usually paid at the winning machine, although higher tier wins may require a hand pay. Local payout is a function of coin hopper capacity and progressive win value.

A game in play during a win at another game is not reset but, rather, game play is allowed to proceed with the meter values frozen upon receipt of a coin. When game play is complete, a win is paid or a loss is generated and the meters are thereafter reset by the progressive controller to the current progressive bonus value.

A game controller produced in accordance with the present invention may be provided in a carousel containing six to sixteen machines. The total number of machines accommodated by the present invention is a function of win frequency per machine. In a preferred embodiment of the invention a win is generated approximately every one half minute (every 8 handle pulls). Accordingly, the value of the progressive bonus rapidly increments and player enthusiasm is generated. Because a coin drop freezes a progressive bonus amount on a particular machine being played, the player knows the value being played for. The present invention finds application in slot machines including single and multiplier machines, multi-line machines, and buy-a-pay machines. The present invention also finds application in other video gaming devices, such as poker and blackjack machines.

BRIEF DESCRIPTION OF THE DRAWINGS

FIGS. 9A and 9B are timing diagrams showing game controller/progressive controller communications; and FIG. 10 is a timing diagram showing progressive controller/game controller communications.

DETAILED DESCRIPTION OF A PREFERRED EMBODIMENT

Figure 1:
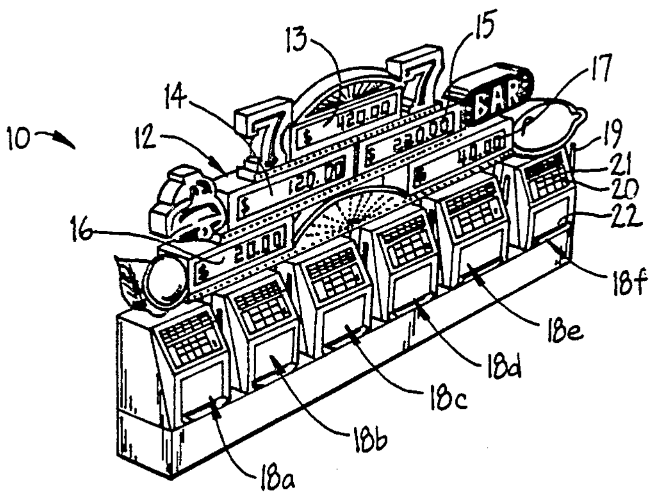
FIG. 1 is a perspective view of a gaming carousel incorporating the present multiple progressive gaming system.

The present invention is a multiple progressive gaming system including at least one gaming controller and a progressive controller. A perspective view of a gaming controller and progressive display carousel 10 is shown in FIG. 1. A progressive display 12 includes displays for each of the winning combinations (in this case slot machine lines). Thus, there is a 7's display 13, a bell display 14, a bar display 15, an orange display 16, and a plum display 17.

In the illustrated embodiment of the invention, six gaming controllers 18*a*–18*f* are shown. Game play is initiated when a coin is dropped through a coin slot 20 and a handle 19 is pulled. Game play is shown on a video display 21 for each gaming controller. A winning game is paid at a payout slot 22. The present invention pays a progressive win locally at the winning machine with the exception of the 7's line in some arrangements.

Figure 2:
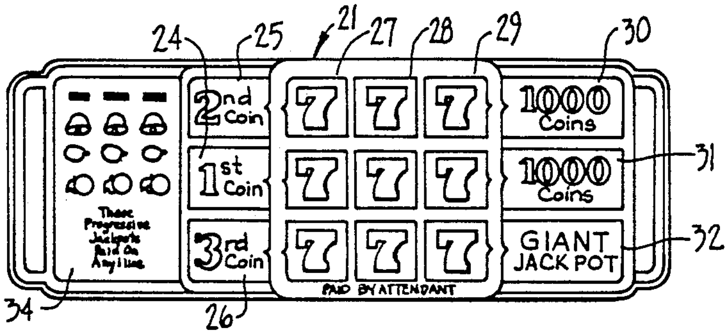
FIG. 2 is a schematic representation of an exemplary gaming controller display.

An exemplary video display 21 is shown in schematic form in FIG. 2. The display shown is for a three line slot machine. It should be appreciated that other displays can be generated for various types of machines such as poker, blackjack, depending on the application to which the invention is put. The display shown in FIG. 2 provides three pay lines 24–26 that may be purchased by dropping coins into the machine prior to play. A first coin selects line 24, a second coin selects line 25, and a third coin selects line 26. A winning combination on any of these lines produces a game win if all three lines are selected. The game win is indicated by movement of reels 27–29 in a vertical fashion. A win is generated when a match is present in all three positions in any one line.

The value of a win on each line is shown at the right hand portion of the display as win lines 30–32. A progressive pay schedule 34 is included that shows the wins that qualify for a progressive jackpot. In some embodiments of the invention, meter information is displayed at this point to apprise the player of the current progressive jackpot value.

The rules of play for the rapidly incrementing progressive gaming system are the same in the slot machine embodiment as for a standard three reel, three line mechanical slot machine. That is, the player inserts one to three coins and pulls the handle. The method of pay determination is unique in the present invention. The pays for oranges, plums, bells, bars, and 7's are determined by pay meters located and displayed at each gaming machine and associated with each symbol type. The pays for cherries are the same as for a standard machine. That is, one cherry pays two, two cherries pays five, and three cherries pays ten.

In the preferred embodiment of the present invention, oranges, plums, bells, and bars pay the display meter amount on one, two, or three coins played. However, 7's pay 1,000 coins on one or two coins played and pay the display meter amount on three coins played only. The display meters are progressive. That is, as coins are played, each meter increases until one of the progressives are "hit". The player is then paid out of the hopper (except on sevens) and the meter is automatically reset to a base value.

In the preferred embodiment of the invention, each coin inserted contributes 25% of its value to the five progressive meters. To obtain the actual machine payout percentage, the progressive contribution percentage is added to the reel strip percentage. For example, a 67% payout reel strip and a 25% progressive contribution yields a 92% payout machine.

For a one dollar machine, 25 cents is contributed to the progressive meters as follows:

| | |
|---|---|
| Oranges | increment 7 cents |
| Plums | increment 6 cents |
| Bells | increment 5 cents |
| Bars | increment 4 cents |
| 7's | increment 3 cents |

The progressive contribution to percentage is the sum of the contributions in cents divided by the denomination in cents:

$$(7+6+5+4+3)/100=25\%$$

For a $0.25 percent machine, 6 cents is contributed to the progressive meter as follows:

| | |
|---|---|
| Oranges | increment 2 cents |
| Plums | increment 1 cent |
| Bells | increment 1 cent |
| Bars | increment 1 cent |
| 7's | increment 1 cent |

Again, the progressive contribution percentage is the sum of the contributions in cents divided by the denomination in cents:

$$(2+1+1+1+1)/25=24\%$$

For a $0.05 machine, the progressive meters are incremented every five coins in as follows:

| | |
|---|---|
| Oranges | increment 2 cents |

-continued

| | |
|---|---|
| Plums | increment 1 cent |
| Bells | increment 1 cent |
| Bars | increment 1 cent |
| 7's | increment 1 cent |

The progressive contribution percentage is the sum of the contribution in cents divided by the denomination in cents times 5 in this example:

$$(2+1+1+1+1)/5*5=24\%$$

The expected maximum value of the 7's meter is calculated in advance. In the preferred embodiment, the following assumptions are made: There is a dollar coin denomination and that, therefore, 3 cents are allocated to the 7's meter for each coin in, 3 coins are played each game, and the machine is a 63 stop machine with nine 7's on reel one, one 7 on reel two, and one 7 on reel three.

The number of reel combinations is:

$C=63^3$ $C=250{,}047$

There are 9 ways (9*1*1) to make 7's on any payline. Therefore, in 250,047 handle pulls, 7's hit:

$S=250{,}047/9=27{,}783$ times, on the long term average.

The probability of hitting 7's in one handle pull is:

$$P=1/S;$$

the probability of not hitting 7's in one handle pull is:

$$P=(1-1/S),$$

the probability of not hitting 7's in N handle pulls is:

$$P=(1-1/S)N.$$

Generally, a value is chosen arbitrarily close to 100% that is referred to as the confidence level. For purposes of example, a confidence of 95% is selected. Thus, it is desirable to know how many games must be played in which it can be 95% certain that 7's hit. This value is calculated by setting P to 5% and solving for N:

$$P=(1-1/27{,}783)N=0.05$$

$$N=\log(0.05)/\log(1-1/27{,}783)$$

$$N=83{,}229 \text{ games}$$

Thus, there is a 95% confidence that 7's hit in 83,229 games played. If the 7's meter starting value is set to $1,000, the expected maximum value is: $1,000×83,229 games×3 coins/game×0.03 dollars/coin=$8,490. It is very unlikely that a casino would have to pay out a 7's win greater than this value and yet the payout is significant enough to encourage increased gaming.

Figure 3:
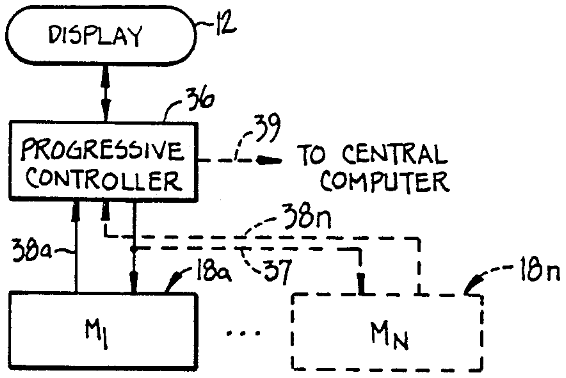
FIG. 3 is a block diagram of a preferred multiple progressive gaming system.

A block diagram of the multiple progressive gaming system is shown in FIG. 3. A progressive controller 36 is coupled to operate a progressive display 12. Display 12 may be included as in the carousel of FIG. 1 or it may be dispensed within some embodiments of the invention. The progressive controller forwards current meter values and reset information via a bus 37 to gaming controllers 18*a*–18*n*. The gaming controllers, in turn, report coin drop and win information to progressive controller 36 via dedicated serial lines 38*a*–38*n*. Communications protocol in the preferred embodiment of the invention are selected to eliminate the problems of gaming controller identification in an expandable installation and bus contention when several machines are operated by a progressive controller.

Figure 4:
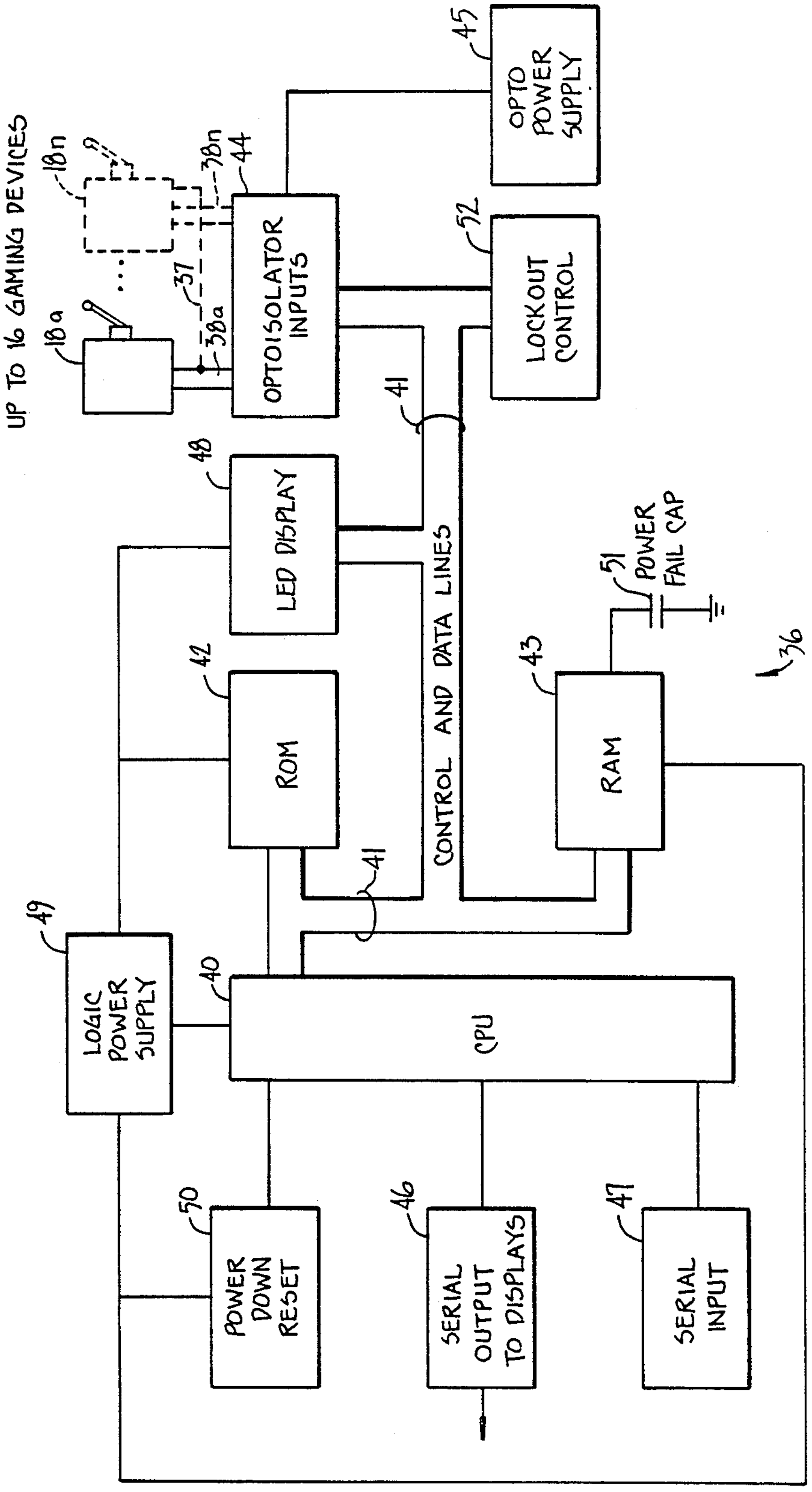
FIG. 4 is a block diagram of a preferred progressive controller.

FIG. 4 is a block diagram of the progressive controller 36. Up to 16 gaming controllers 18*a*–18*n* may be coupled via communication lines 37 and 38*a*–38*n* to progressive controller 36 via an optoisolator input 44. The optoisolator is provided to prevent interference, transients, power surges, etc. from interfering with communications between the gaming controllers and the progressive controller. The optoisolator input circuit is powered by an optopower supply 45. The optoisolator receives and transmits data over a control and data bus 41 coupled to CPU 40. CPU 40 operates in accordance with a program stored in ROM 42. A microfiche appendix listing an exemplary progressive controller computer program is included with the present application.

During operation, CPU 40 accumulates various meter values and performs various calculations in a random access memory 43. The random access memory includes a power failure circuit 51 which may be a very large value capacitor capable of maintaining a charge on the random access memory for a period of several hours in the event of power failure. The progressive controller includes an LED display 48 for providing various operations and diagnostic indications, and a lockout control circuit 52 for inhibiting circuit operation. The CPU is powered by a logic power supply 49 and operates with a power down reset circuit 50 for saving CPU state information in the event of a power failure. Additionally, the CPU provides a serial output 46 to drive a display 12, such as the display shown in FIG. 1. A serial port 47 is also provided for coupling the progressive controller to a central computer via a communications bus 39.

The progressive controller includes logic power supply 49, optopower supply 45, CPU 40, power down reset circuit 50, ROM 42, RAM 43, a power failure circuit 51, an LED display 48, lockout control 52, optoisolator inputs 44, and a serial output driver 46.

Logic power supply 49 consists of two +5-volt DC regulated supplies. A diode bridge rectifies a 20-volt AC input and is filtered by two 4,700-microfarad capacitors. The outputs of the power supplies are clamped with two 1N5233B center diodes for overvoltage protection. One power supply powers CPU 40 and the other power supply powers the progressive controller logic.

The optocouple power supply includes a diode bridge rectifier to rectify 12-volt AC supplied by the 12-volt transformer and also includes a 4,700-microfarad capacitor. The optopower supply is used to supply power to the anodes of ILQ-74 optoisolators.

CPU 40 is an 8031 microprocessor. ROM 42 is a 27C64E PROM. RAM 43 is a 4116 dynamic random access memory. The CPU, ROM, and RAM work together to control system operation. ROM 42 contains a progressive controller program. The CPU controls display operation and stores necessary information during power failure in accordance with ROM procedures. Power to maintain RAM contents intact during power interruptions is provided by power fail circuit 51, which may be a 0.47-farad capacitor. The capacitor is used like a battery and is discharged through a diode and a 22-ohm resistor.

LED display 48 is used during game set up to display the current jackpot amount, base jackpot amount, jackpot limit amount, and add amount. This information is set by a plurality of switches or may be controlled by software within the ROM. The information for the LED display is latched off the data/address bus via three 74LS374 latches. The latches are clocked by the CPU. Two ULN2003 drivers are used to drive the LED digits; a 74LS240 driver is used to drive each LED segment.

The optoisolator input consists of 16ILQ74 optocouplers, a 74LS373, a 74LS374, and a 74LS138 logic circuit. When the optocoupler is turned on by the input from a gaming device, the collector of the selected optocoupler goes low. The low level signal thus produced is transferred to data and control bus 41 by the logic circuits. This information is then read by CPU 40 to determine if the signal is a coin-in signal or a jackpot signal. If the signal is a coin-in signal, CPU 40 increments the jackpot amount. If the signal is a jackpot signal, CPU 40 can either reset the jackpot back to the base amount, lock out all gaming devices, freeze the jackpot amount, or perform any combination of the three.

Lockout control circuit 52 includes a 74LS04 inverter, an ILQ-74 optocoupler, and four TIP125 transistors. Four outputs from CPU 40 are used to control the transistors. The inverter takes the signals from CPU 40 and turns the optocoupler on or off in accordance therewith, which accordingly controls any transistors. In this way, the gaming device may be locked out.

The serial output to the displays uses a 7404 inverter and four 75183 dual differential drivers. CPU 40 sends display information from an internal serial port to the inverter, where the information is inverted to drive the dual differential drivers. The differential output is then transmitted to the display drivers.

The display may be of any type currently available for receiving serial information and providing a digital readout in accordance therewith. Local game controller resident display information is provided via the optoisolator to each game to increment and external gaming display, as shown in FIG. 2.

Figure 5:
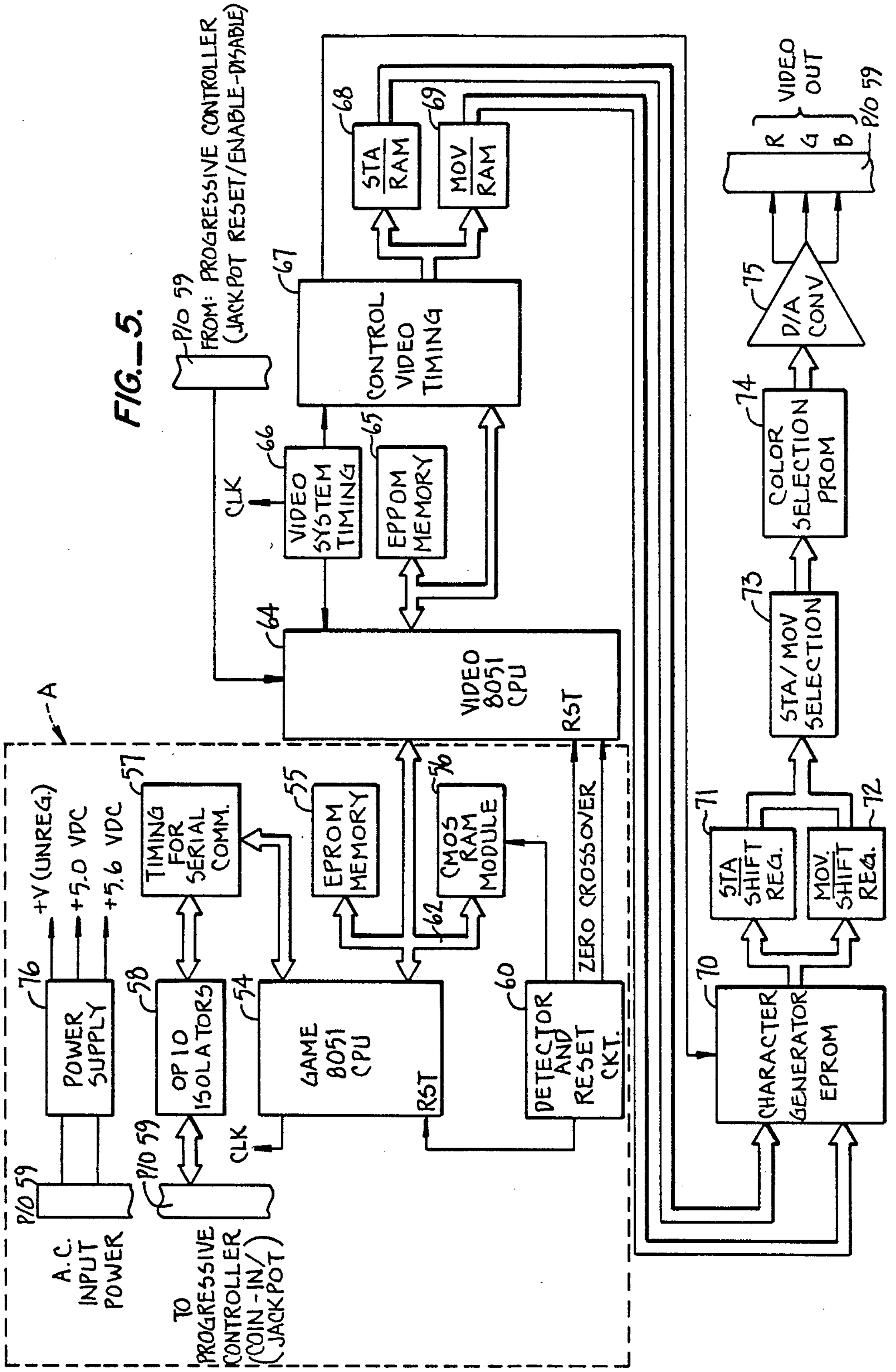
FIG. 5 is a block diagram of a preferred gaming controller.

FIG. 5 is a block diagram of a gaming controller. The gaming controller may be configured as a slot machine, poker machine, or other such machine as desired. Any number of gaming controllers may be connected to a progressive controller, or a single gaming controller may incorporate a progressive controller within its cabinet to provide a single machine progressive jackpot. Additionally, the progressive controller may be incorporated with one gaming controller which is adapted to receive a plurality of other gaming controllers. The circuitry shown in block form in FIG. 5 is that for a dual processor video gaming device. The requirements of a gaming controller for use with the progressive controller 36 are a data output including coin drop and win information and a data input for receiving progressive bonus meter value and reset information.

The gaming controller shown in FIG. 5 includes a game central processing unit 54 and a video central processing unit 64. Game processor 54 operates in accordance with an E$^2$PROM memory 55 that supplies instruction over a data/address bus 62. The E$^2$PROM memory contains a program for operating the game and accordingly determines what type of game the gaming controller is, e.g. a slot machine. A program for operating CPU 54 is included as an appendix to this application.

During game operation, various calculations need to be made by the game CPU. Additionally, there are totals and meter amounts to be stored by the game CPU. Such information is stored in a CMOS RAM module 56. Game CPU 54 includes an internal serial port coupled to a serial communications module 57 which is in turn coupled to the progressive controller via optoisolators 58. The optoisolators are provided to prevent interference along the communication line from affecting game operation. A gaming connector 59 is included for coupling the progressive controller via a cable to the gaming controller. The serial communication port from game CPU 54 provides coin in and win (jackpot) information to the progressive controller.

The gaming controller includes a power supply 76 which receives AC power from a connector 59. A power detector and reset circuit 60 is also provided to maintain game operation and integrity in the event of power interruptions.

Video CPU 64 provides signals to select and display images on a color monitor, such as display 21 (FIGS. 1 and 2). Because color monitors are well known in the electrical arts, a circuit diagram of an exemplary monitor is not considered necessary for complete, enabling disclosure of the present invention. Images formed by color monitor 21 are composed of image element character blocks represented in an addressable character generator 70. The image element character blocks can be moved to any location on the video display screen area, held stationary, or moved continuously. Video processor 64 controls all video operations for the gaming controller in accordance with commands transmitted from game CPU 54 via a dual data/address bus 62. Video processor 64 may be of the type described in pending patent application Ser. No. 406,672, filed 9 Aug. 1982 now U.S. Pat. No. 4,517,654, entitled "Video Processing Architecture", invented by Wesley F. Carmean, and assigned to the assignee of the present patent application, IGT Corporation, of Reno, Nev.

A control and video timing circuit 67 operates under video CPU control to generate control and addressing signals for character generating E$^2$PROM 70. Control video timing circuit 67 also generates horizontal/vertical video synchronization signals for the color monitor. The video processor 64 receives input data over dual bus 62 and generates images in accordance with the data supplied. Data supplied are in the form of image movement and game image display information. Video CPU operation is directed in accordance with a program and E$^2$PROM memory 65. On the occurrence of certain game conditions, video processor 64 addresses E$^2$PROM memory 65 and receives instructions. An E$^2$PROM memory program is included as part of an appendix to this document.

Video processor 64 is in communication with a control/video timing circuit 66 by which horizontal and vertical video synchronization is maintained and by which video information is coordinated under CPU control. Video processor 64 and system timing are controlled by video system timing circuit 66. In response to game commands in accordance with instructions in E$^2$PROM memory 65, video CPU 64 assembles addresses into stationary random access memory (RAM) 68 and RAM 69. The addresses assembled in RAM 68 and 69 are indicative of memory locations of data within the character generator E$^2$PROM 70. The character generator $E^2$PROM includes a character program which is provided as part of an appendix to this document.

Each image location in the RAM contains an address of the character to be generated by the $E^2$PROM and that accesses a unique image building block located in the $E^2$PROM at that address. Accordingly, video processor 64 assembles the stationary and movable plane image in RAMs 68 and 69 consisting of addresses, each address being the location of a unique portion of the image to be formed.

Data representing the image to be formed are shifted out of character generator $E^2$PROM 70 in parallel. Data corresponding to the stationary plane image are shifted into a stationary shift register 71. Data corresponding to the movable plane image are shifted into a movable shift register 72. On video CPU command, the data in shift registers 71 and 72 are shifted out in the form of strings of digital words corresponding to the video lines to be formed on the video display.

At each display location, a priority is assigned to one of the movable and stationary plane images. A selection is made between the stationary plane image and the movable plane image in each video display location by the stationary/movable selection circuit 73. Portions of the viewed image are the stationary plane and other portions of the video image are of the movable plane. In this way, the movable plane image may move across the image formed by the stationary plane image or the stationary plane image may mask a portion of the movable plane image, depending on the desired image to be displayed.

The information to be displayed on the video display is presented to a color selection PROM 74 and, under video CPU control, colors are assigned to the building blocks making up the image on a pixel-by-pixel basis. Thus, each building block may have a plurality of colors assigned thereto.

The digitized video image, consisting of portions of the stationary and movable plane, and having color data assigned thereto, is presented to a digital-to-analog converter 75, wherein the digital information is converted to analog video information. The analog video signal is then output to connector 59 to drive a CRT display to display the assembled image.

Communications between the progressive controller and the gaming controller are bidirectional. Accordingly, the game CPU reports coin drop and win information to the progressive controller as outlined above. Jackpot reset and enable/disable signals are received at video CPU 64 via connector 59.

Figures 6, 6A:
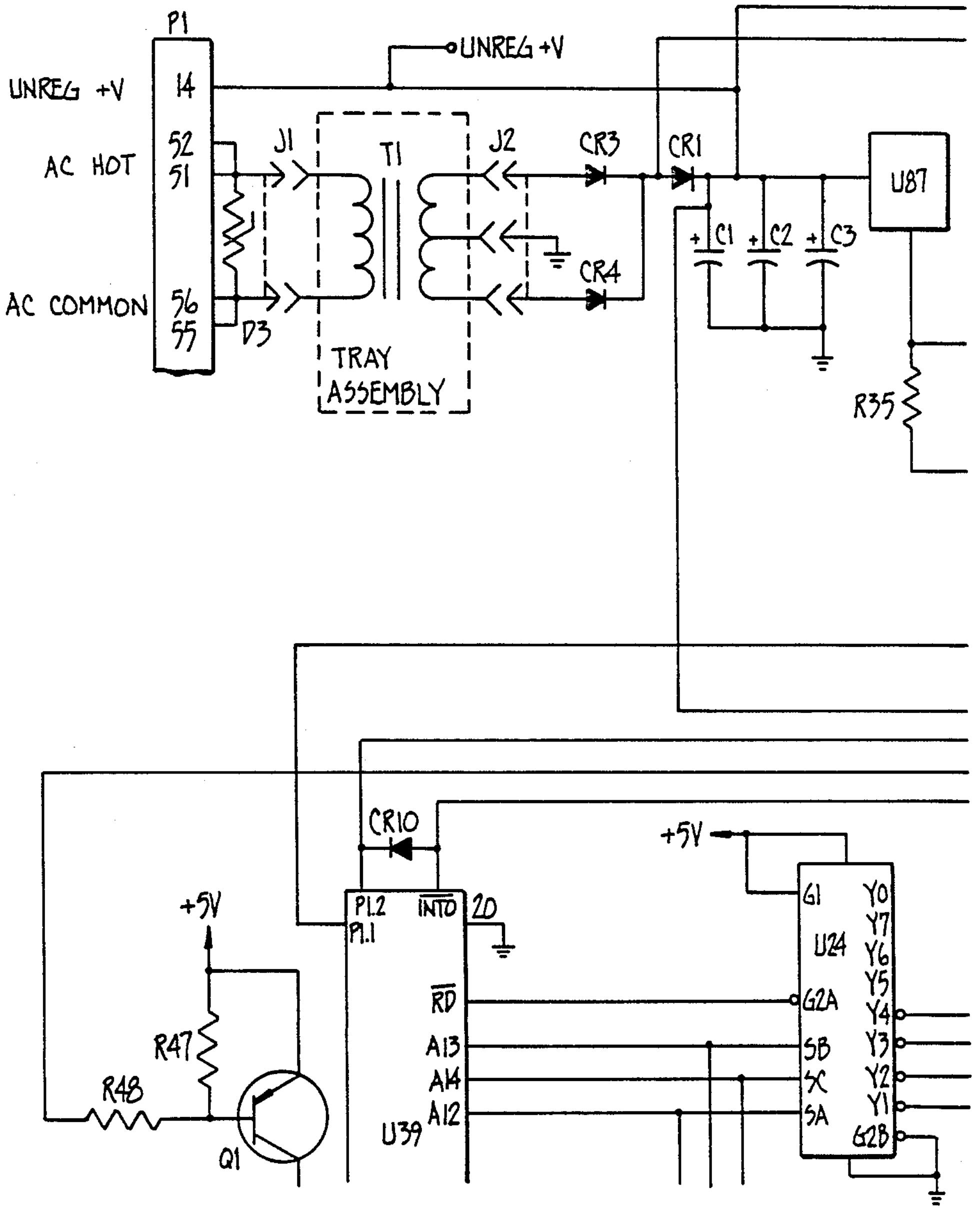
FIGS. 6 and 6A–6H are schematic diagrams of a preferred game control processing unit (CPU)
Figure 6B:
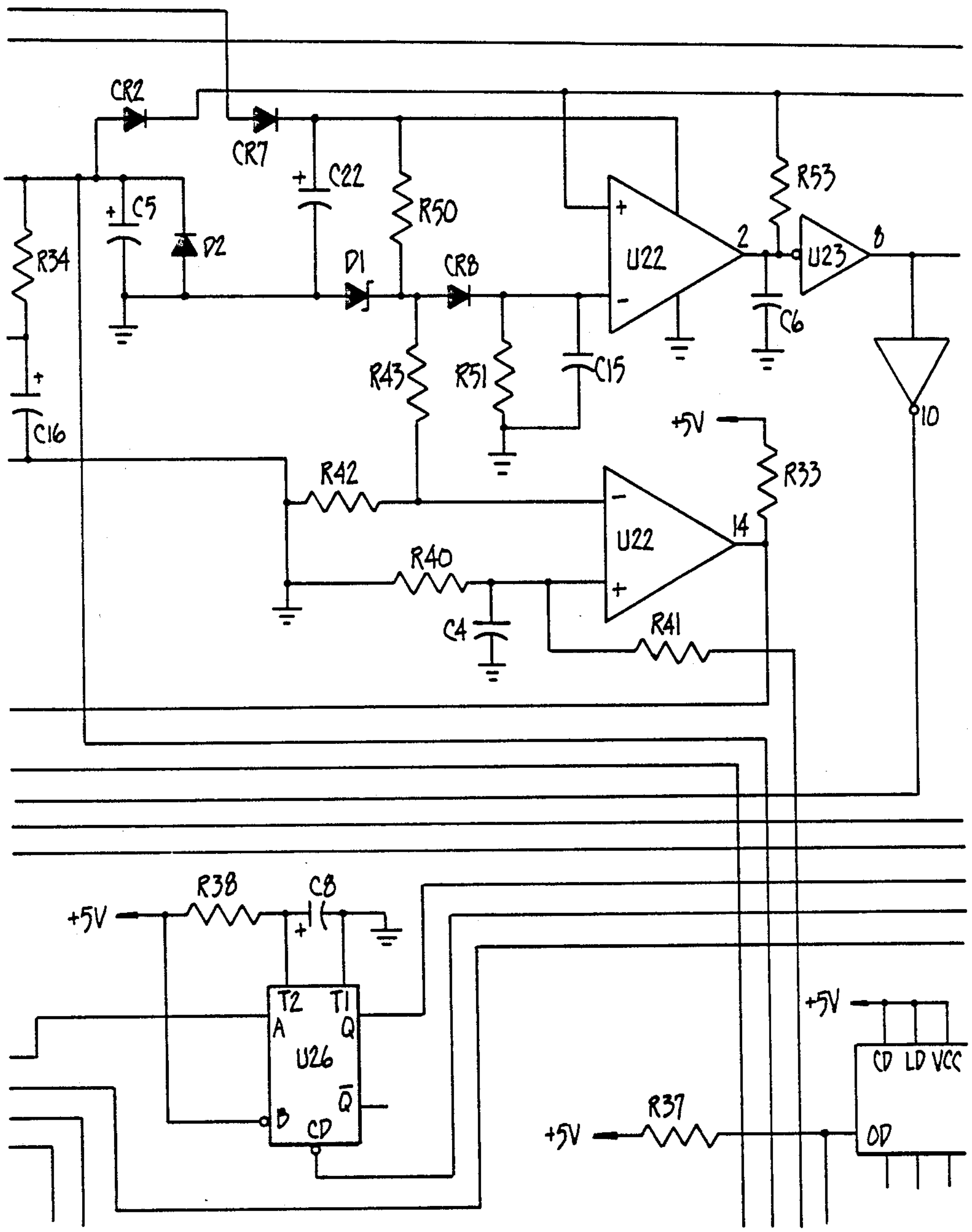
Figure 6C:
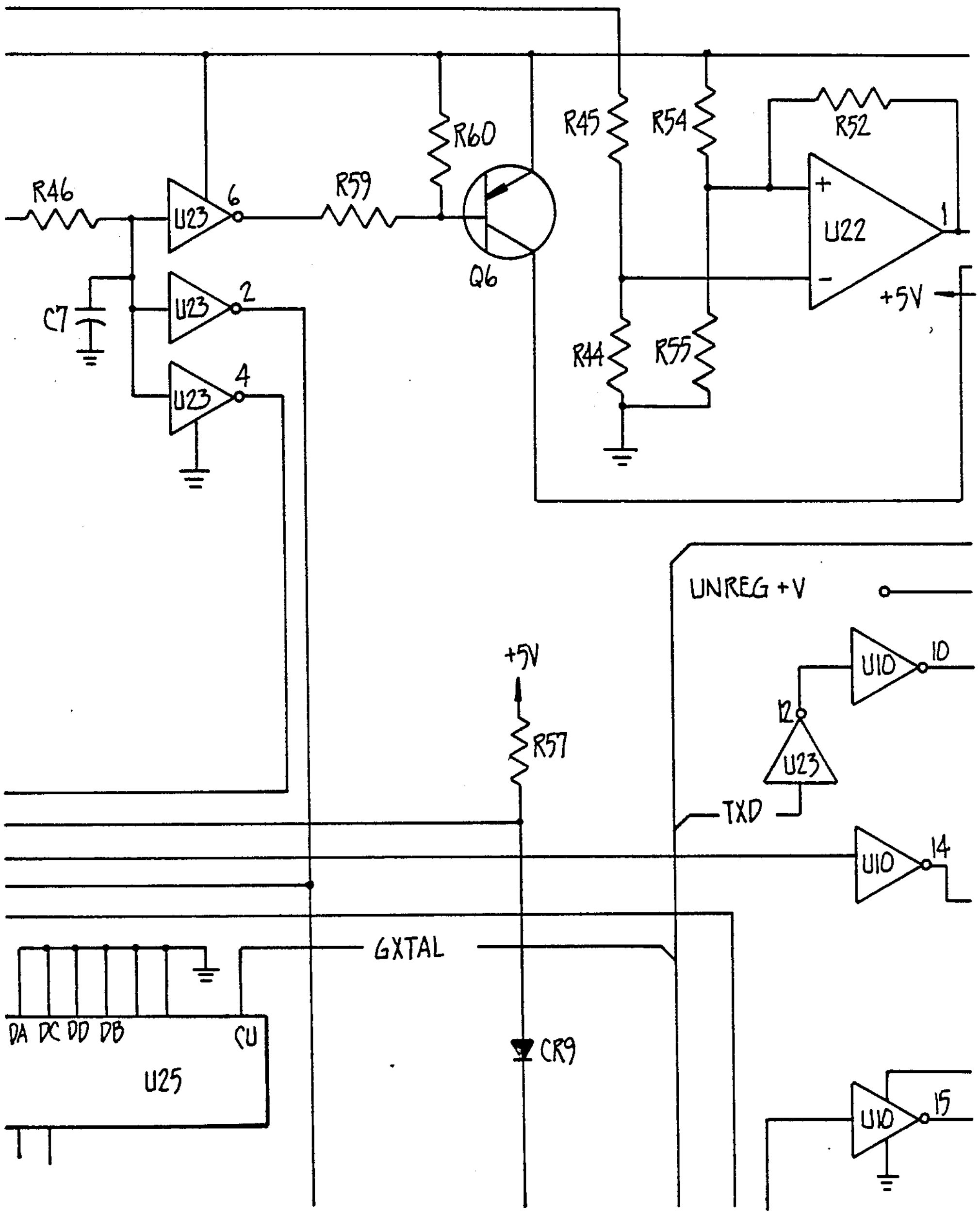
Figure 6D:
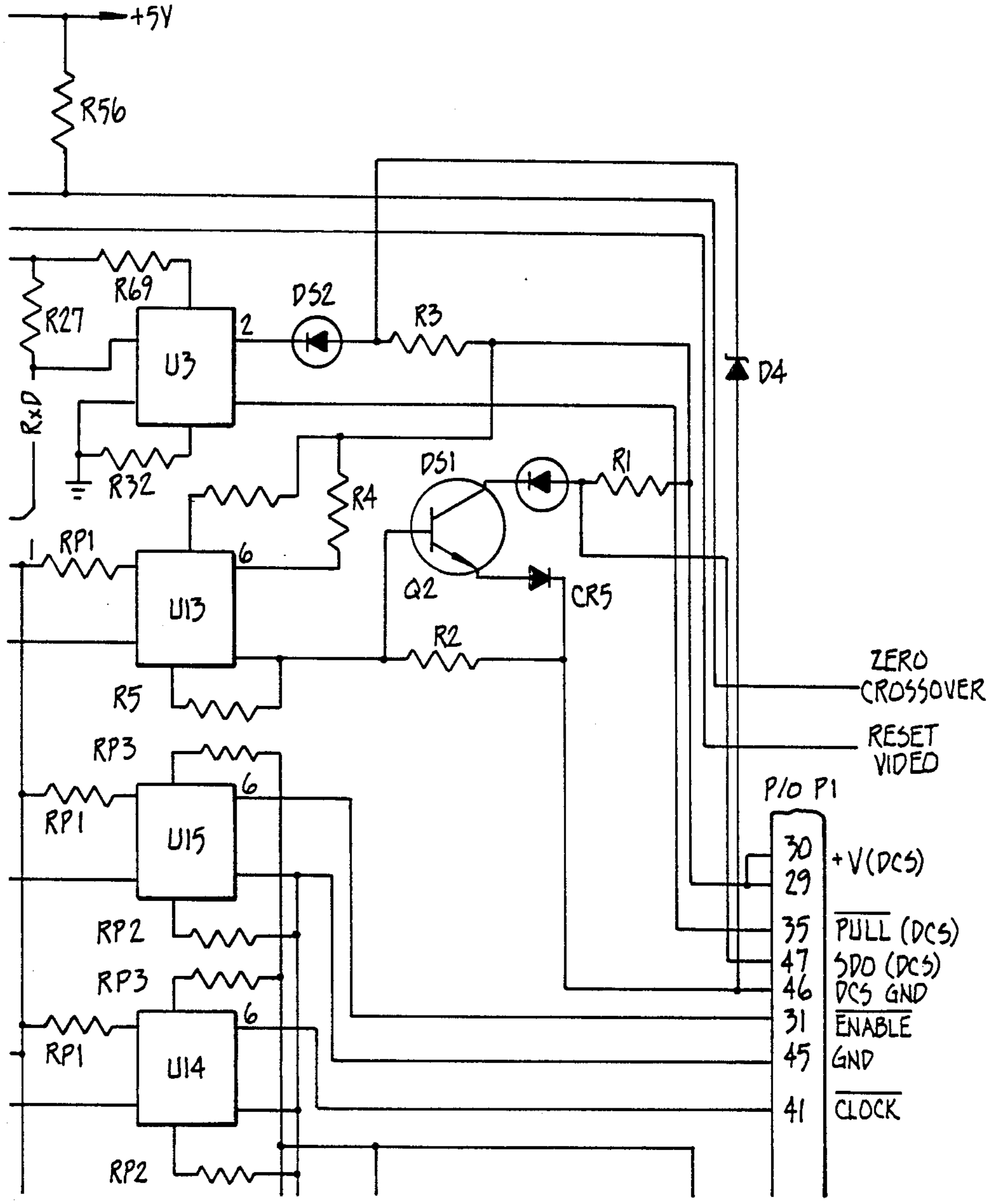
Figure 6E:
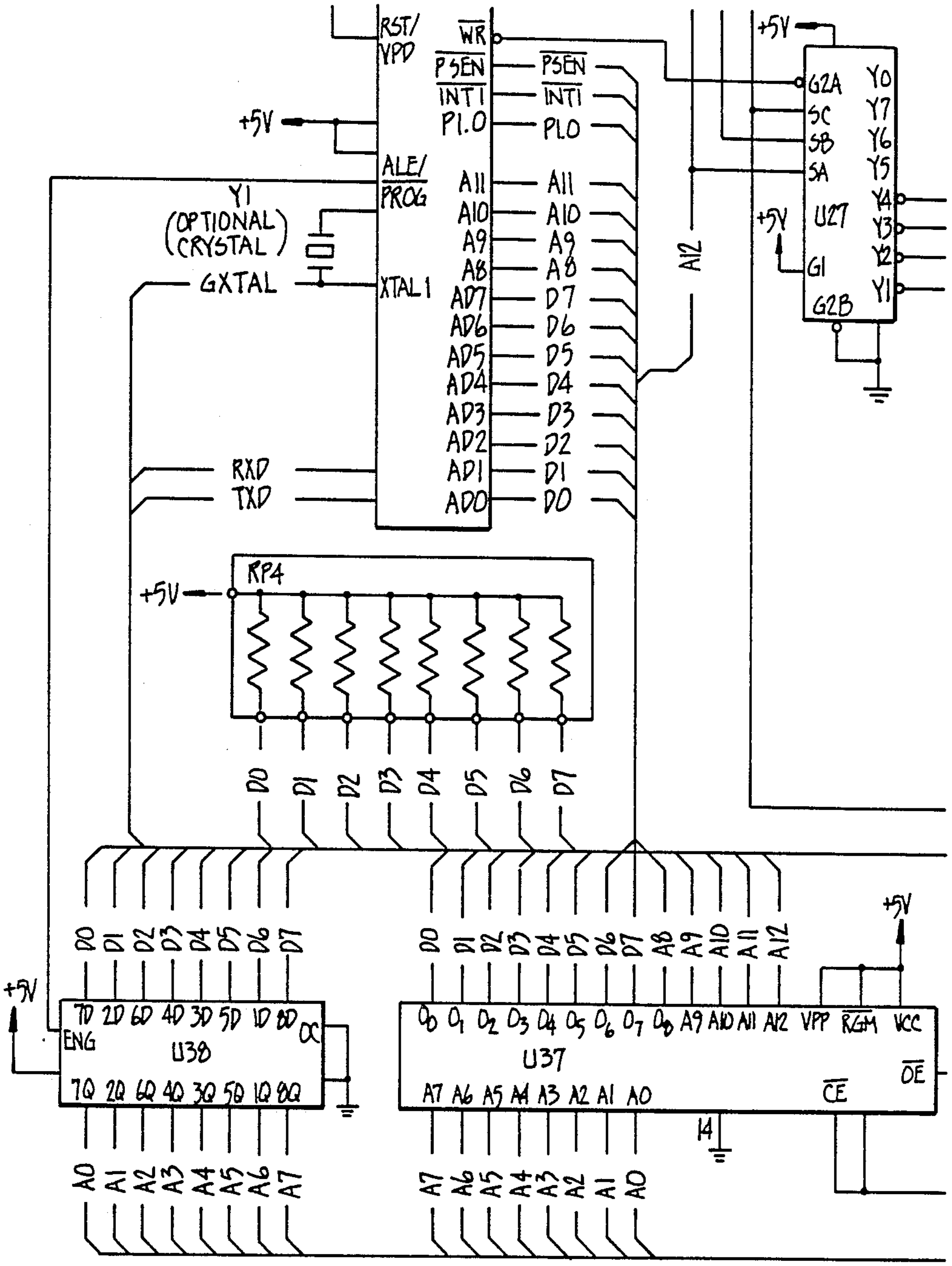
Figure 6F:
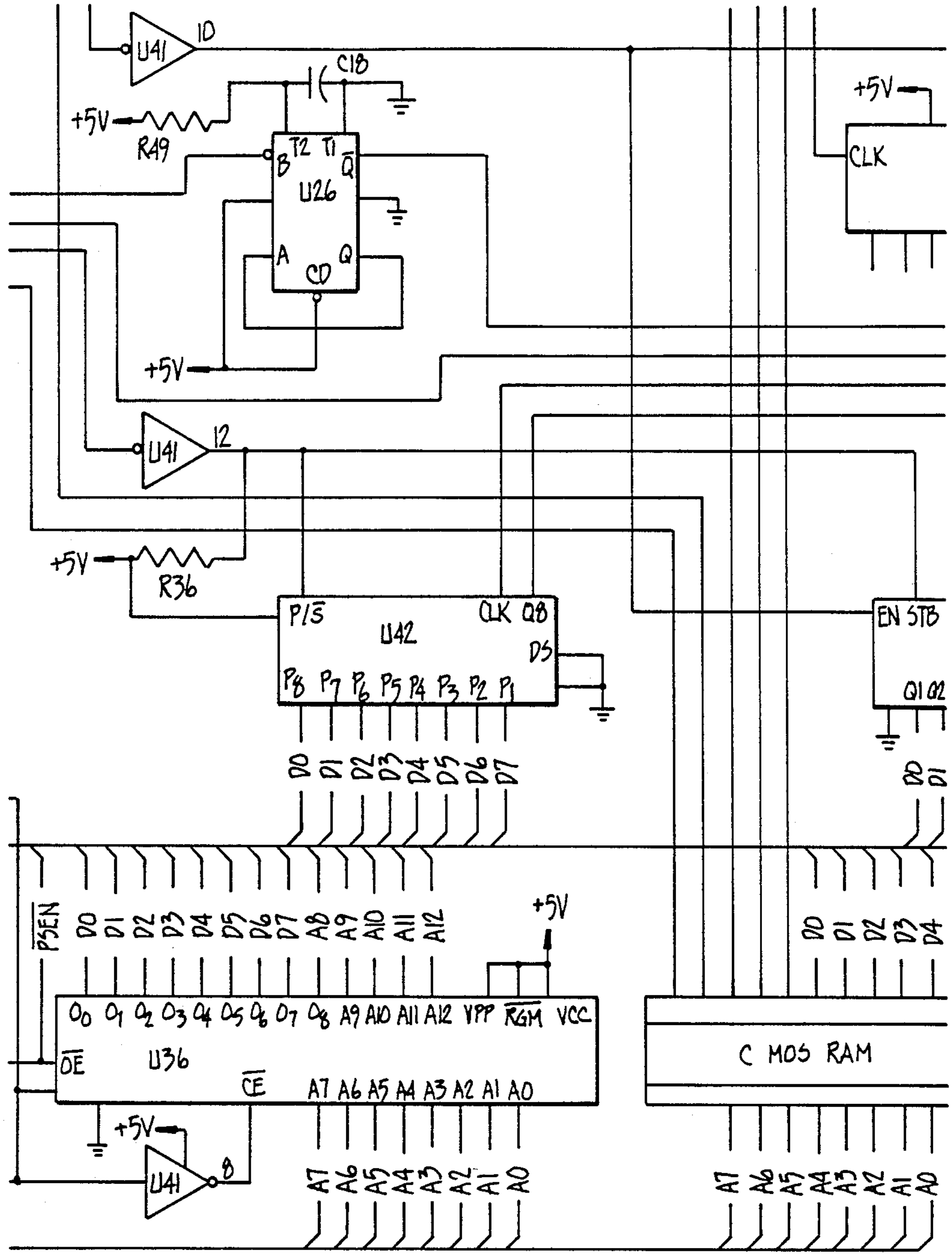
Figure 6G:
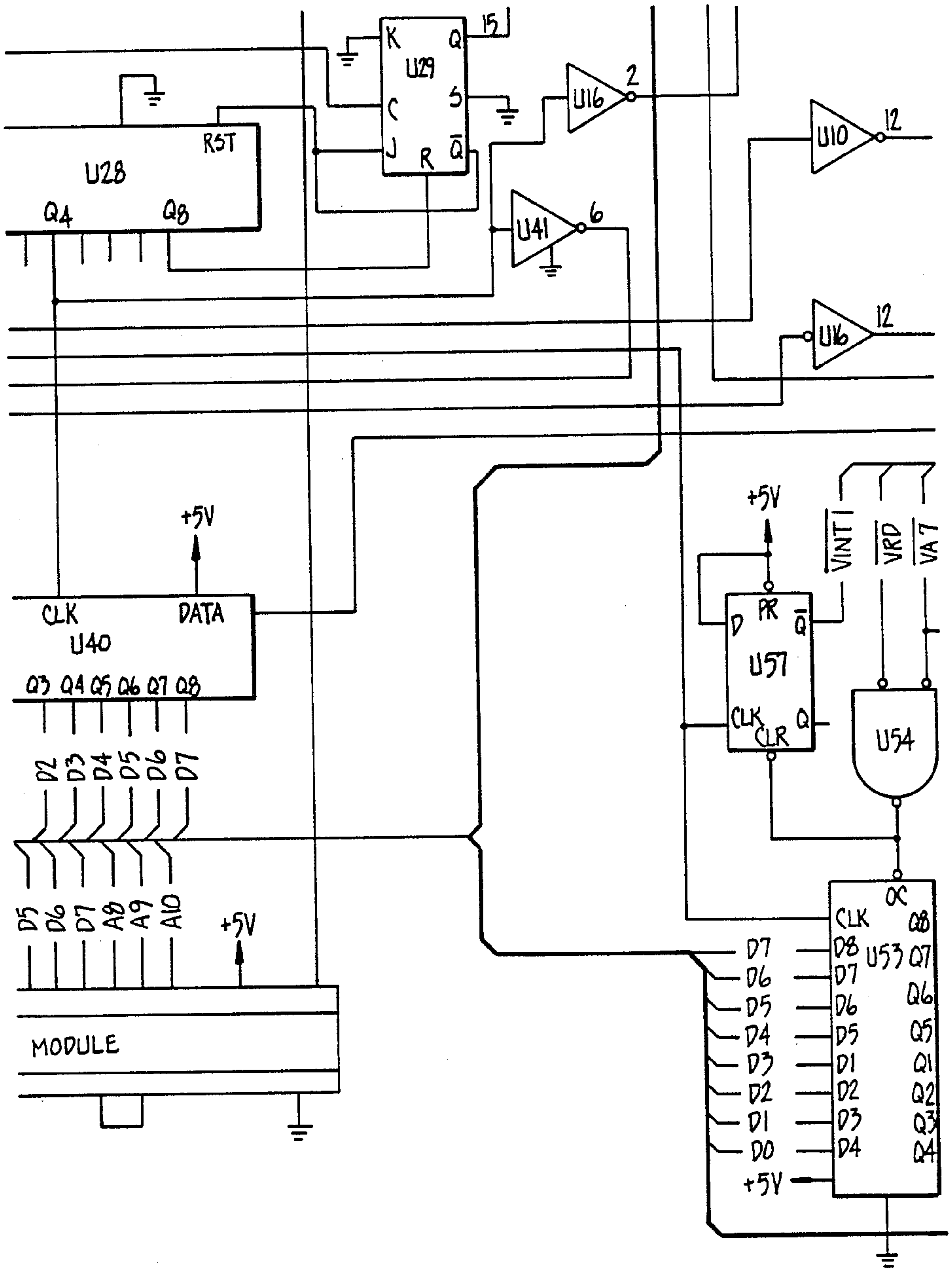
Figure 6H:
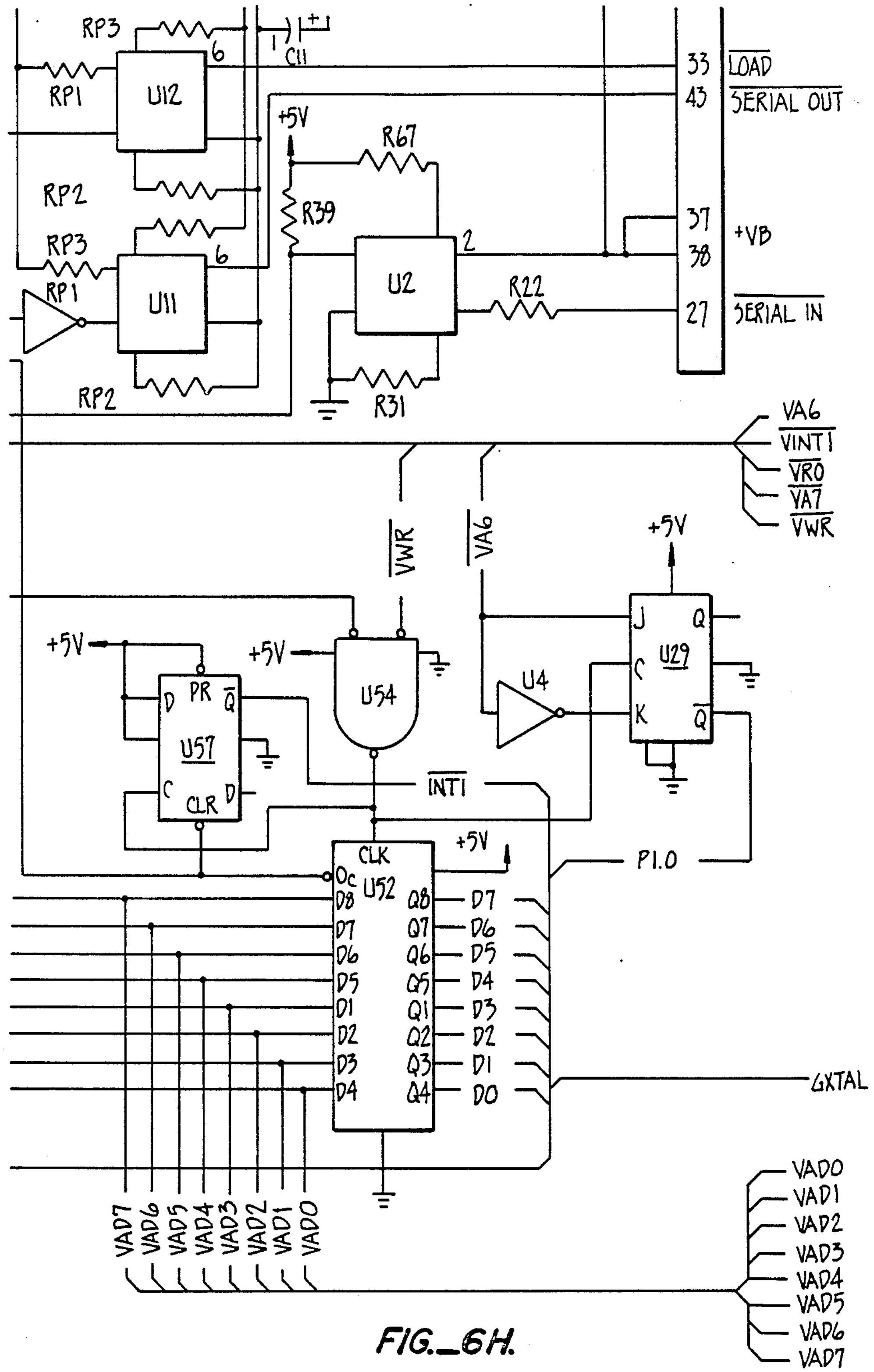

FIG. 6 is a schematic diagram of an exemplary game processor A. Table 1 provides a list of industry standard components that may be used in the exemplary embodiment of the invention constructed according to the circuit disclosed in the FIGS. 6 and 7. Game processor U39 operates in accordance with the program instructions stored in ROM memory U36/U37. Communications between the microprocessor module and the other modules in the circuit are via optoisolators U3/U11–U15. Communications with video CPU 64 are via dual communications port 37, which is comprised of latches U52/U53. Game CPU U39 also includes a half duplex serial data line for two-way communications with the progressive controller. Each gaming controller is connected to a serial bus in parallel with other gaming controllers. The progressive controller addresses the gaming controllers by dedicated lines to each of the gaming controllers.

TABLE 1

EXEMPLARY COMPONENTS LISTING

| IDENTIFIER | FIG. | INDUSTRY DESIGNATION |
|---|---|---|
| U2/U3/U11-U15 | 6 | GN139 |
| U10 | | 2003 |
| U16/U41 | | 74LS04 |
| U22 | | LM3302 |
| U23 | | 4584 |
| U24 | | 74LS138 |
| U25 | | 74LS193 |
| U26 | | 4098 |
| U28 | | 4040 |
| U29 | | 4027 |
| U36/U37 | | 2764 |
| U38 | | 74LS373 |
| U39 | | 8051 |
| U40 | | 4094 |
| U42 | | 4021 |
| U52/U53 | | 74NC374 |
| U54 | | 74LS32 |
| U57 | | 74LS74 |
| U87 | | LM338 |
| U1/U3/U11/U19/U32/U43 | 7 | 2003 |
| U2/U35/U36/U41 | | 4021 |
| U4-U6/U9/U10/U12/ U16-U18/U20/U24/ U26/U29/U33/U34/ U37/U38/U40 | | H11A1 |
| U8/U15/U23/U30/U39 | | 4094 |
| U21/U22/U27/U28 | | 14584 |

Figures 7, 7A:
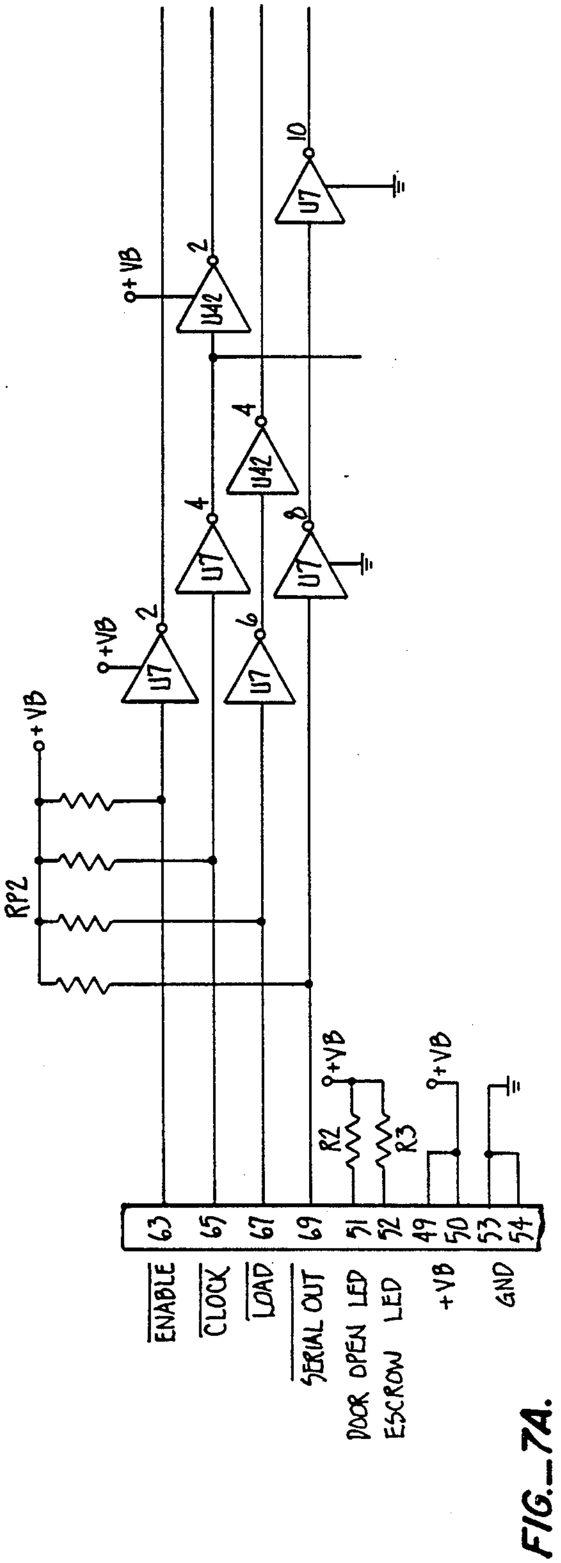
FIGS. 7 and 7A–7F are schematics diagrams of a preferred game interface.
Figure 7B:
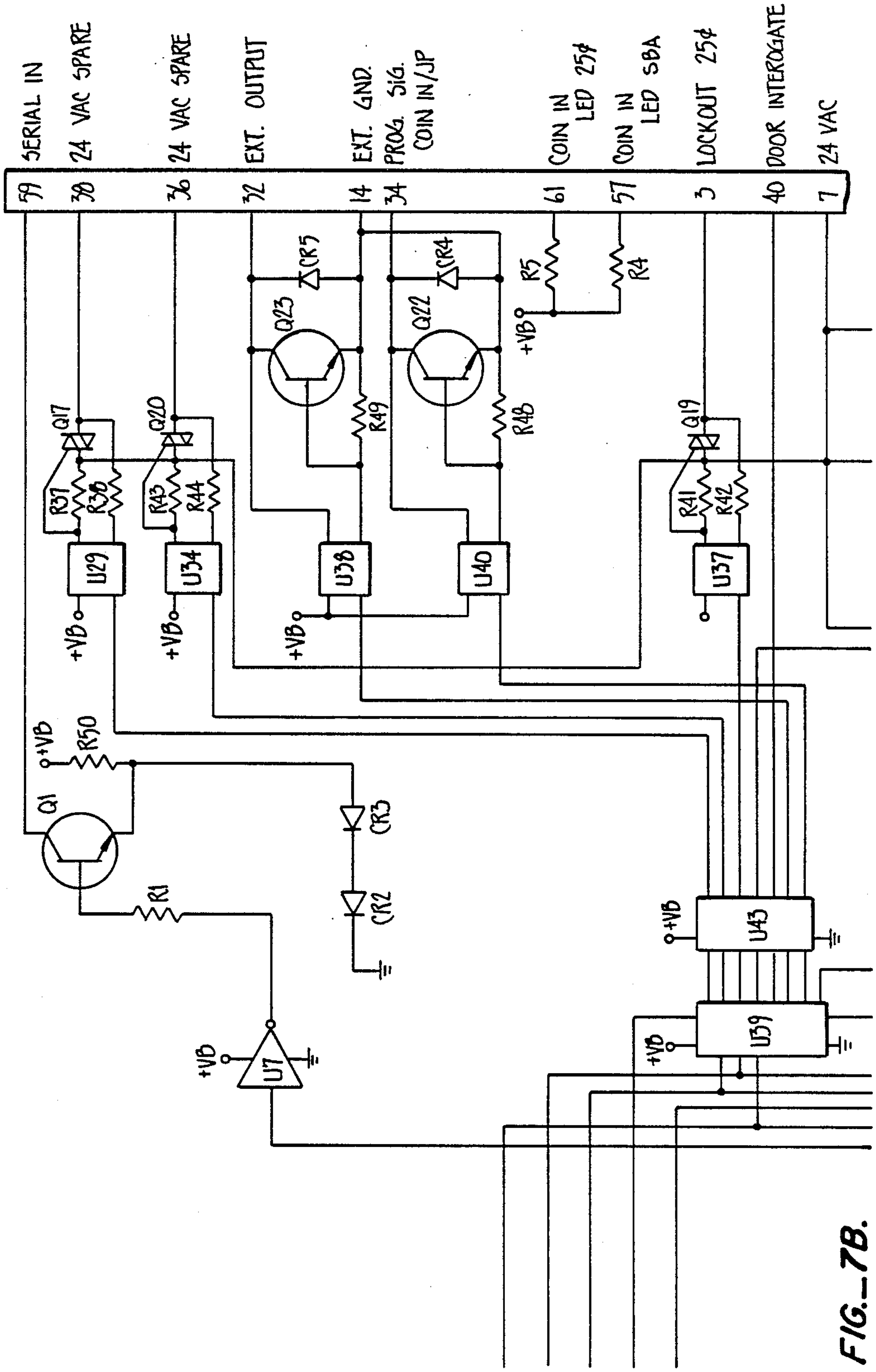
Figure 7C:
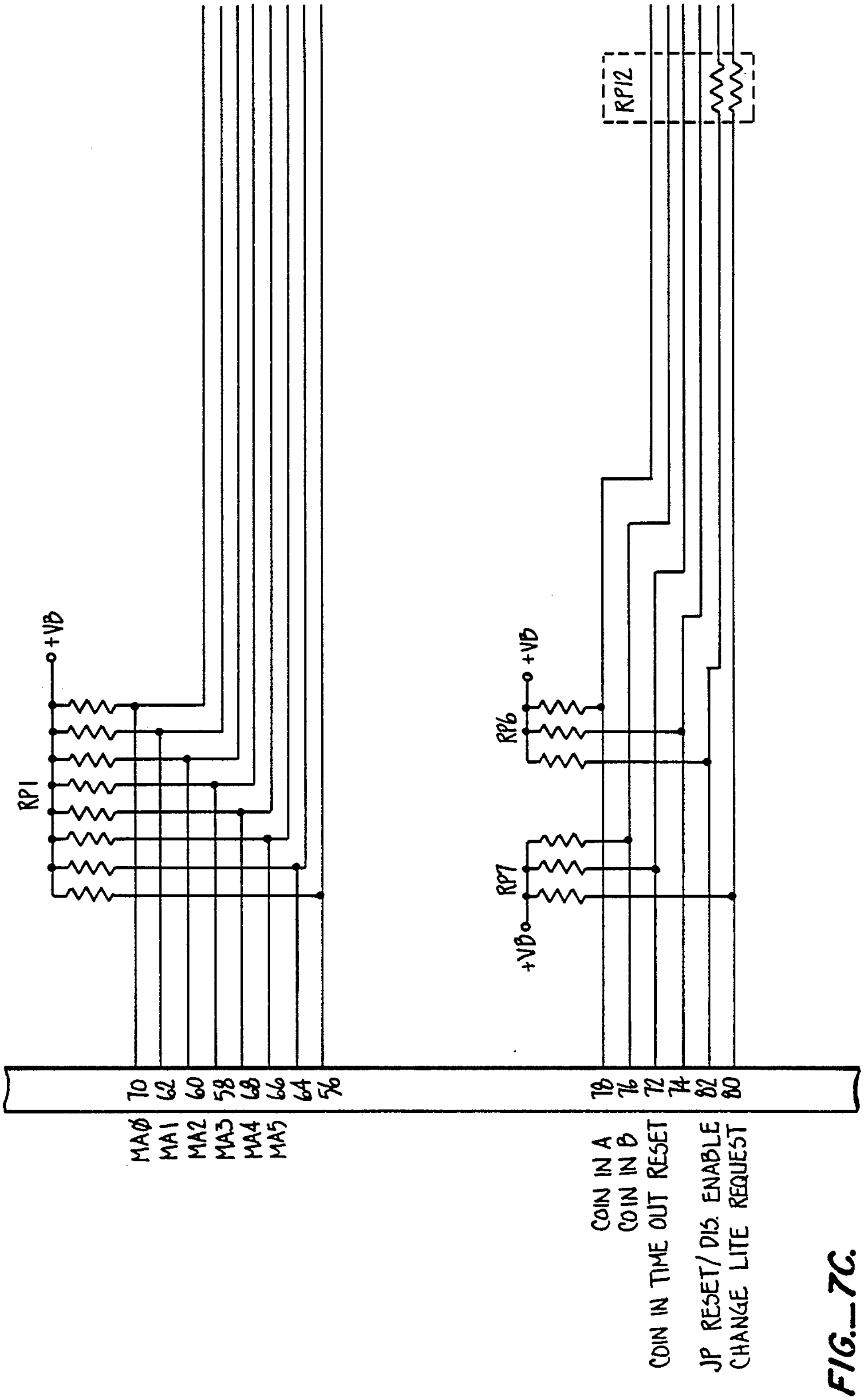
Figure 7D:
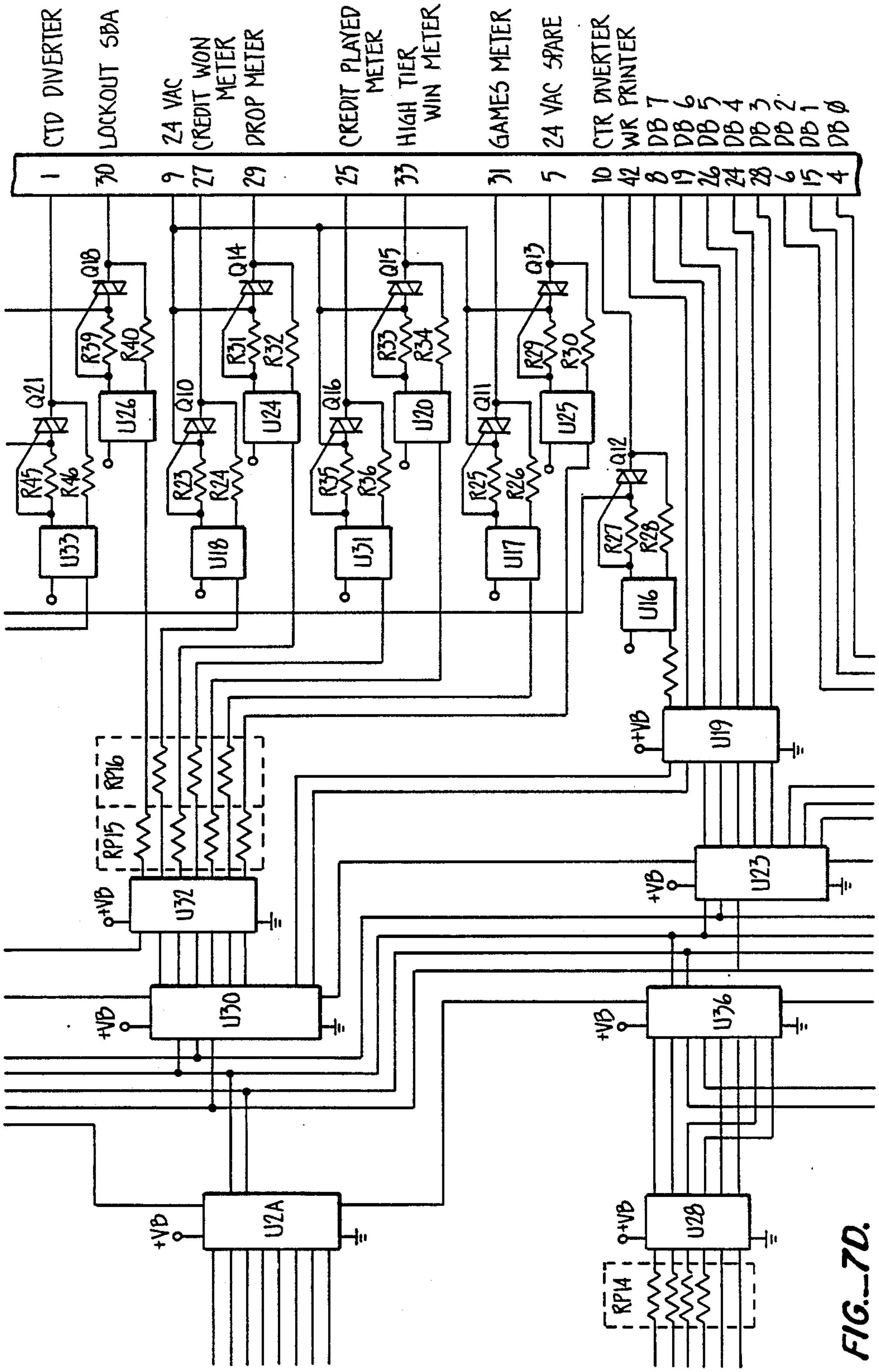
Figure 7E:
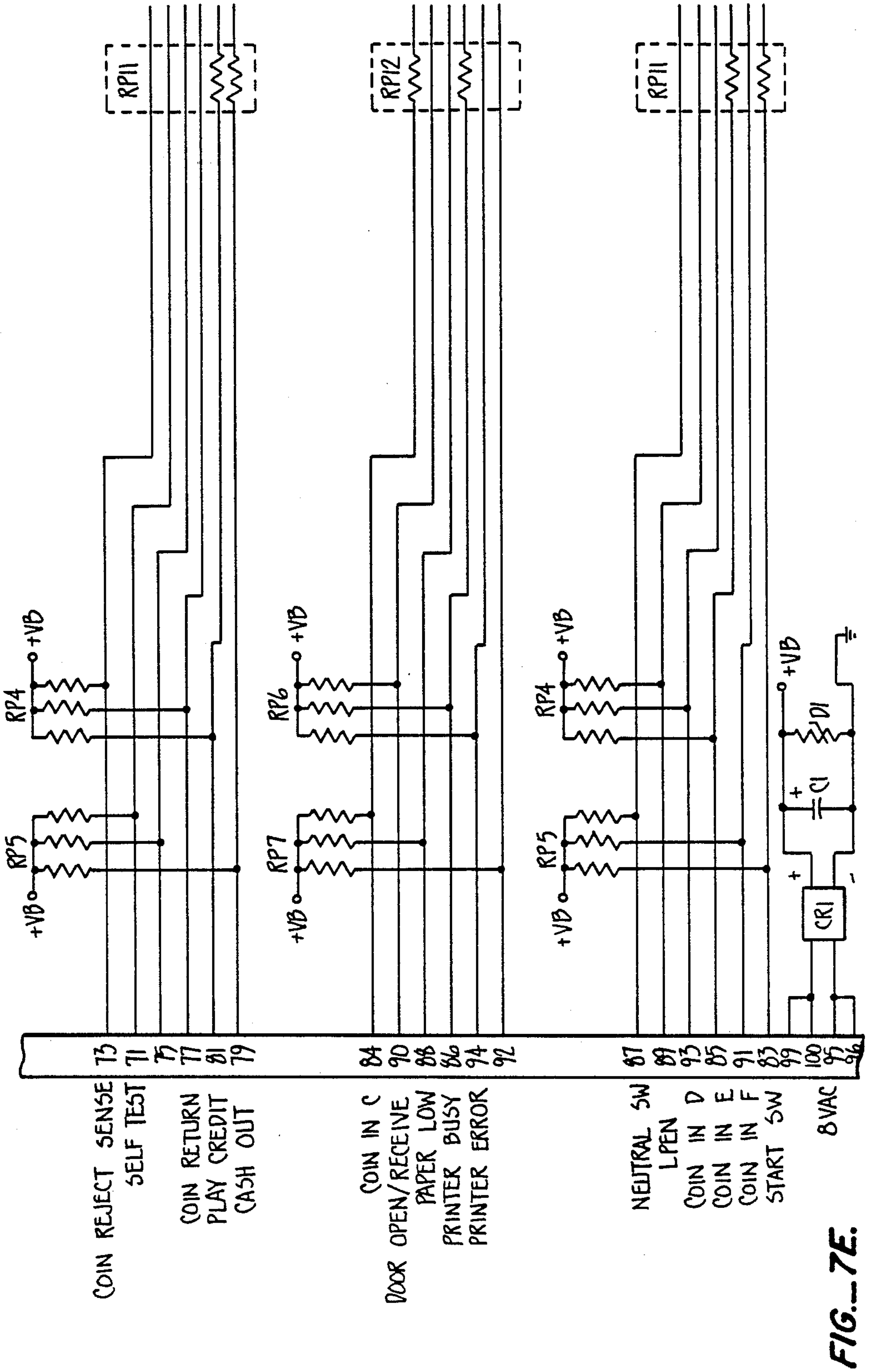
Figure 7F:
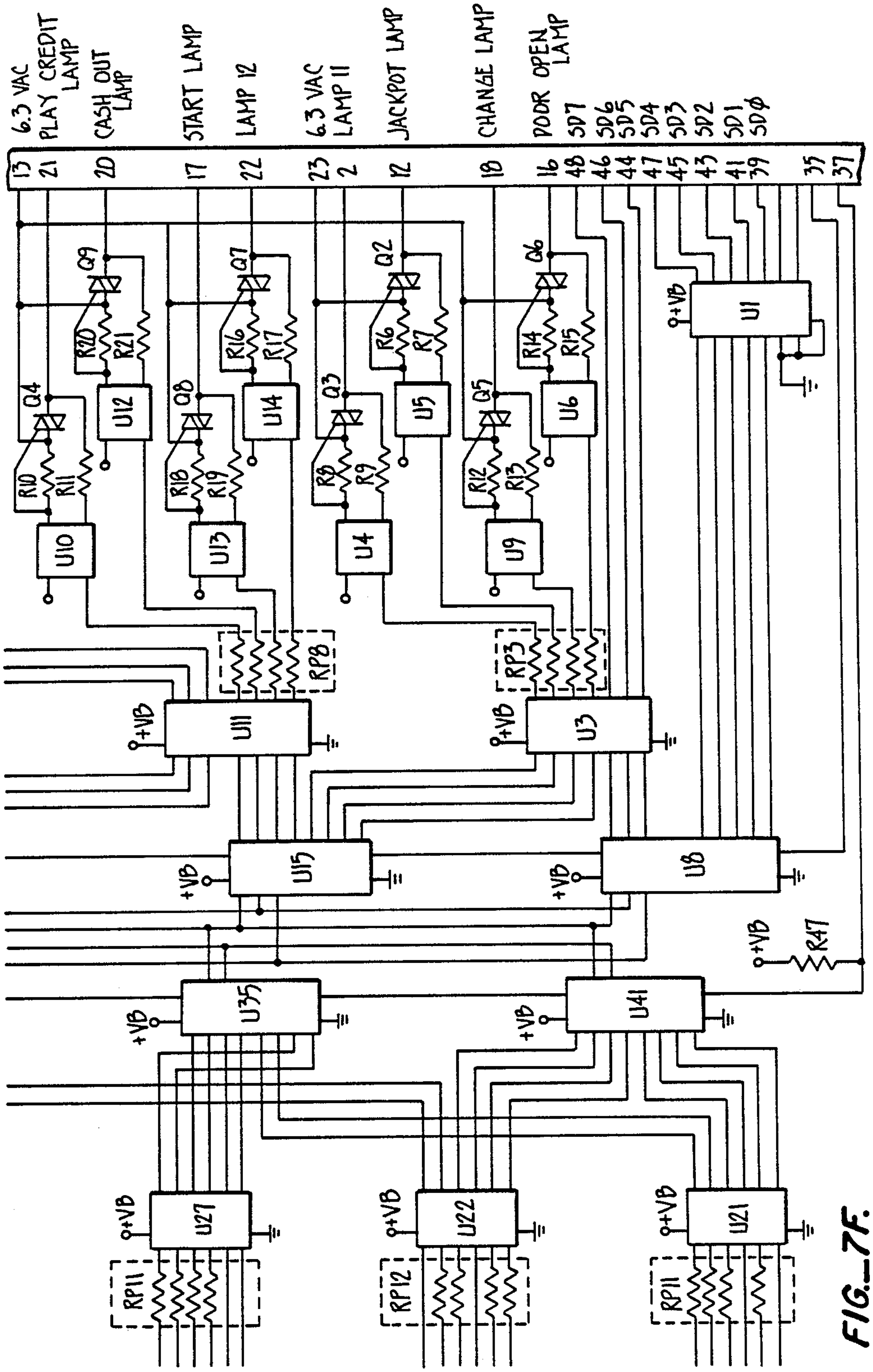

FIG. 7 is a schematic diagram of a gaming controller interface module. The diagram shows a plurality of latches that are addressable according to a decoded memory address present at a decoder U2A. When addressed, each latch produces an output signal indicative of a signal condition at the latches input. Accordingly, optoisolated output signals are provided to operate various gaming controller features. Some such operation is a result of address and data information provided by game CPU 54. Other such controllers are the function of combination logic in the interface modules.

Figure 8:
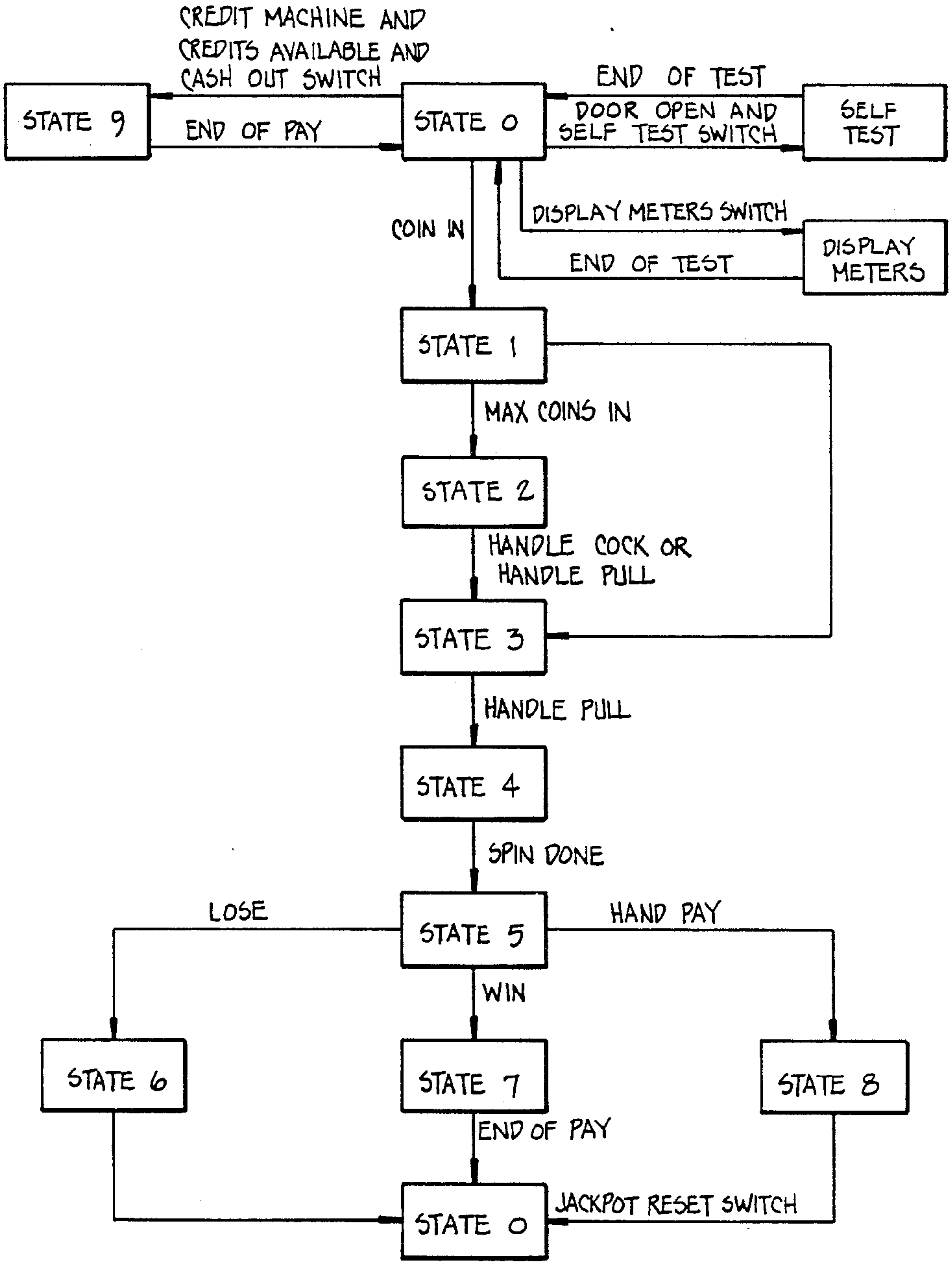
FIG. 8 is a game state flow diagram.

FIG. 8 is a flow diagram of the progressive gaming device game states. The game states are summarized as follows:

STATE 0—the system idle state. The system waits for a coin in, self test switch, display meter switch, door open condition, any coin tilt condition. When coin-in is detected, the program vectors the program to STATE 1. The self test switch vectors the program to the self test mode and display meter switch vectors the program to the display meters mode. The door open and tilt conditions are monitored in all states via a periodic interrupt routine.

STATE 1—the system idle start of game state. One or more coins have been inserted by the player and the program is waiting for a start game indication (handle pull) or a maximum bet. The GAME OVER message is removed along with any previous game winner messages. Maximum bet vectors the program to STATE 2 and a handle pull vectors the program to STATE 3.

STATE 2—the maximum coin bet state. The coin accepter is locked out and any inserted coin type messages are removed from the screen. A handle pull or handle cock causes the program to STATE 3.

STATE 3—the spin setup state. The random numbers are selected that point to the symbols representing the starting symbols on each reel strip in a slot machine type game. Any late coins are then handled. If STATE 3 is entered by a handle cock signal, a handle pull vectors the program to STATE 4. Otherwise, the program falls through to STATE 4.

STATE 4—the spin state. The reel strip data is indexed through by the game CPU and read by the video CPU to cause the reel strip spin to occur. The end of the last reel spin the program vectors move to STATE 5.

STATE 5—the evaluate or check for pays state. The final reel stop positions are checked against the pay combinations table and memory to determine the total pay, if any. No pay vectors the program to STATE 6. Any pay less than 300 coins in the exemplary embodiment of the invention vectors the program to STATE 7 and any pays greater than 300 coins vectors the program to STATE 8.

STATE 6—the lose state. The total losses meter is incremented and the program vectors to STATE 0.

STATE 7—the win state. The proper number of coins are paid out or in a credit machine, the proper number of credit is awarded. The program then vectors to STATE 0.

STATE 8—the hand pay state. The jackpot mechanical and electronic meters are incremented. The program vectors to STATE 0 when the jackpot reset switch is activated.

STATE 9—cash out credit state. In a credit machine, the program vectors if credits are available and the player activates the cash out button. If less than 300 credits are available, the machine's internal coin hopper (not shown) pays out the proper amount, or else there is a hand pay condition.

Game play is a function of a random number generator. An exemplary random number generator for use with the present invention includes two linear feedback shift register pseudo-random number generators to operate in conjunction with game CPU 54. Each shift register is 32 bits in length in the exemplary embodiment of the invention. Feedback points are chosen to give the maximum length sequence. The length of the sequence of random numbers of these generators are 232−1=4,294,967,303. Thus, each shift register generates 4,000,000,000 different random numbers of 32 bits each before repeating a sequence.

During all idle modes of game operation, one of the shift registers is constantly cycled. Such cycling effectively randomizes the sequence of the shift register and eliminates the fixed pattern inherent in a software pseudo-random number generator. At the start of a game, the other shift register is cycled once. The two shift registers are then added together, yielding a third 32-bit number which is then divided by the maximum number plus one required by the game. The 8-bit remainder of the division is used as a random number for the game to determine game win or loss. If more than one number is required by a game, the above steps, beginning with the 32-bit addition, are repeated for each number. Thus, for a three reel slot, three numbers are required and the process is repeated three times.

Game communications are provided from the gaming controller to the progressive controller on a serial bus having one or more gaming controllers connected in parallel. Communications from the progressive controller to the gaming controller are over dedicated lines from the progressive controller to each gaming controller. This arrangement is provided to eliminate bus contention and to simplify game controller addressing. Other such communication schemes may be provided, including data encryption, if desired.

FIGS. 9 and 10 provide a summary of gaming controller/progressive controller communications protocol. FIG. 9*a* is a timing diagram showing coin-in pulses reported by the gaming controller to the progressive controller. At time 1 ($t_1$) a header is generated by the gaming controller indicating a new game. Thereafter, a pulse is generated indicating each coin drop to the progressive controller. The header pulse is distinguished from the coin-in pulse by its duration. The time between coin-in pulses is dependent on game play, although the time between the header and the first coin-in pulse is fixed because the header is a function of the first coin drop.

FIG. 9*b* is a timing diagram showing a win or jackpot condition signal reported from the game controller to the progressive controller. At time 4 ($t_4$) a winning header is produced by the gaming controller which is distinguished from other types of signals by its duration. Thereafter, pulses are provided indicating winning line numbers or coin column in a slot machine type gaming controller. The combination of pulses following the header determines the type of win and accordingly, the proper progressive jackpot to be reset.

FIG. 10 is a timing diagram showing a serial bit stream transmitted from the progressive controller to the gamiing controllers. The information transmitted is provided to increment progressive meter values. Such information is necessary because the various gaming controllers in a multigaming controller environment are incremented at independent rates. Thus, a meter total must be provided from the progressive controller to each of the gaming controllers if the gaming controllers are to have a current progressive bonus in the value displayed.

A header portion is first sent that identifies the transmission as a meter update. The header includes information indicating which display in a progressive bonus is to be updated with the present information. Thereafter, various bytes of information are provided to indicate the update of various digits in that particular display. Reset information is provided in a similar manner.

During the anomalous situation where a player has inserted a coin and there is a win by another player during the first player's game play, the first player's progressive bonus meter values are frozen. Accordingly, should the first player also win the same progressive bonus, the value awarded would be what was expected upon initially playing the game. After the payout of the first winning game player's game has been made, the game reconnects itself to the progressive controller and the meter values are thereafter updated in accordance with the progressive values.

The present invention provides a rapidly incrementing multiple progressive gaming system. One or more gaming controllers provide a variable pay line that corresponds to game play frequency. In a multigame environment, the probability of a large win over a short period of time is radically increased, thereby enhancing the excitement of the game play. Accordingly, the present invention is a radical departure from typical gaming device philosophy that awards a fixed amount on a win condition.

We claim:

1. A multiple progressive gaming system comprising:

a plurality of gaming means, each for accepting a pay-in, for generating a random output with a selected set of said random outputs being winning outputs, and for delivering a payout when a winning output is generated;

a plurality of display means for displaying a progressive numerical value, with the progressive numerical value displayed by each of said display means indicating the payout for a given one of said winning outputs;

means for incrementing the progressive numerical value displayed by each of said display means by a preselected percentage of the pay-in to any of said gaming machines when a non-winning output is generated, where said progressive numerical values are displayed at each gaming machine; and means for freezing for progressive numerical values displayed at a given gaming machine between the pay-in and game output for the given gaming machine.

* * * * *